US 9,491,721 B1

United States Patent
Marupaduga et al.

(10) Patent No.: US 9,491,721 B1
(45) Date of Patent: Nov. 8, 2016

(54) DYNAMICALLY MODIFYING POWER HEADROOM PROHIBIT TIMERS BASED ON SIGNALING LOAD

(71) Applicant: Sprint Communications Company L.P., Overland Park, KS (US)

(72) Inventors: Sreekar Marupaduga, Overland Park, KS (US); Rajveen Narendran, Olathe, KS (US); Nitesh Manchanda, Overland Park, KS (US); Vanil Parihar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/041,564

(22) Filed: Feb. 11, 2016

(51) Int. Cl.
*H04B 7/00* (2006.01)
*H04Q 7/20* (2006.01)
*H04W 52/36* (2009.01)
*H04W 4/00* (2009.01)
*H04W 76/04* (2009.01)
*H04W 72/04* (2009.01)
*H04W 88/08* (2009.01)

(52) U.S. Cl.
CPC .......... *H04W 52/367* (2013.01); *H04W 4/005* (2013.01); *H04W 52/365* (2013.01); *H04W 72/0413* (2013.01); *H04W 76/046* (2013.01); *H04W 88/08* (2013.01)

(58) Field of Classification Search
CPC .. H04W 52/30; H04W 4/005; H04W 52/365
See application file for complete search history.

(56) References Cited

U.S. PATENT DOCUMENTS

| 8,565,205 | B2 | 10/2013 | Ho et al. | |
| 9,078,225 | B2 | 7/2015 | Hosein et al. | |
| 2012/0184221 | A1* | 7/2012 | Jung | H04W 24/10 455/67.11 |
| 2014/0018124 | A1* | 1/2014 | Ahn | H04W 24/10 455/522 |
| 2014/0274196 | A1* | 9/2014 | Dai | H04W 52/242 455/522 |

* cited by examiner

*Primary Examiner* — Nguyen Vo

(57) ABSTRACT

The technology disclosed herein enhances the operation of a Long Term Evolution (LTE) access node to dynamically modify power headroom (PHR) prohibit timers. In one implementation, a method of operating a LTE access node includes communicating first signals with wireless communication devices in device to device (D2D) communication groups using a first PHR timer. The method further provides identifying a signaling load for the wireless communication devices, and determining if the signaling load meets signaling criteria. The method also includes, if the signaling load meets the signaling criteria, identifying a second PHR prohibit timer, and providing the wireless communication devices with the second PHR prohibit timer.

20 Claims, 6 Drawing Sheets

DYNAMICALLY MODIFYING POWER HEADROOM PROHIBIT TIMERS BASED ON SIGNALING LOAD

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some Long Term Evolution (LTE) communication systems, wireless communication devices may provide power headroom (PHR) notifications to LTE access nodes, which indicate how much relative power is left to transmit data in addition to the power being used in the current transmission. These notifications are transferred from the devices over intervals specified by the LTE access node, wherein the LTE access node can dictate periodic intervals for the transmission of the PHR notifications and/or PHR prohibit timers that specify the minimum number of packets that must be transmitted between PHR notifications. However, although the LTE access node may specify the intervals at which devices may transmit PHR notifications, current LTE access nodes are incapable of dynamically providing PHR interval rules based on network conditions.

Overview

The technology disclosed herein enhances the ability of Long Term Evolution (LTE) networks to dynamically modify power headroom (PHR) prohibit timers. In one implementation, a method of operating a LTE access node to dynamically modify PHR prohibit timers includes receiving wireless signals from a plurality of wireless communication devices using a first PHR prohibit timer, wherein the plurality of wireless communication devices comprises one or more device to device (D2D) communication groups. The method further provides determining a signaling load for the plurality of wireless communication devices, and determining whether the signaling load meets signaling criteria. If the signaling load meets the signaling criteria, the method also includes identifying a second PHR prohibit timer, wherein the second PHR prohibit timer is higher than the first PHR prohibit timer. The method further provides, if the signaling load meets the signaling criteria, receiving network access requests from a second plurality of wireless communication devices and providing the second plurality of wireless communication devices with the second PHR prohibit timer, wherein the second plurality of wireless communication devices comprises one or more additional D2D communication groups.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
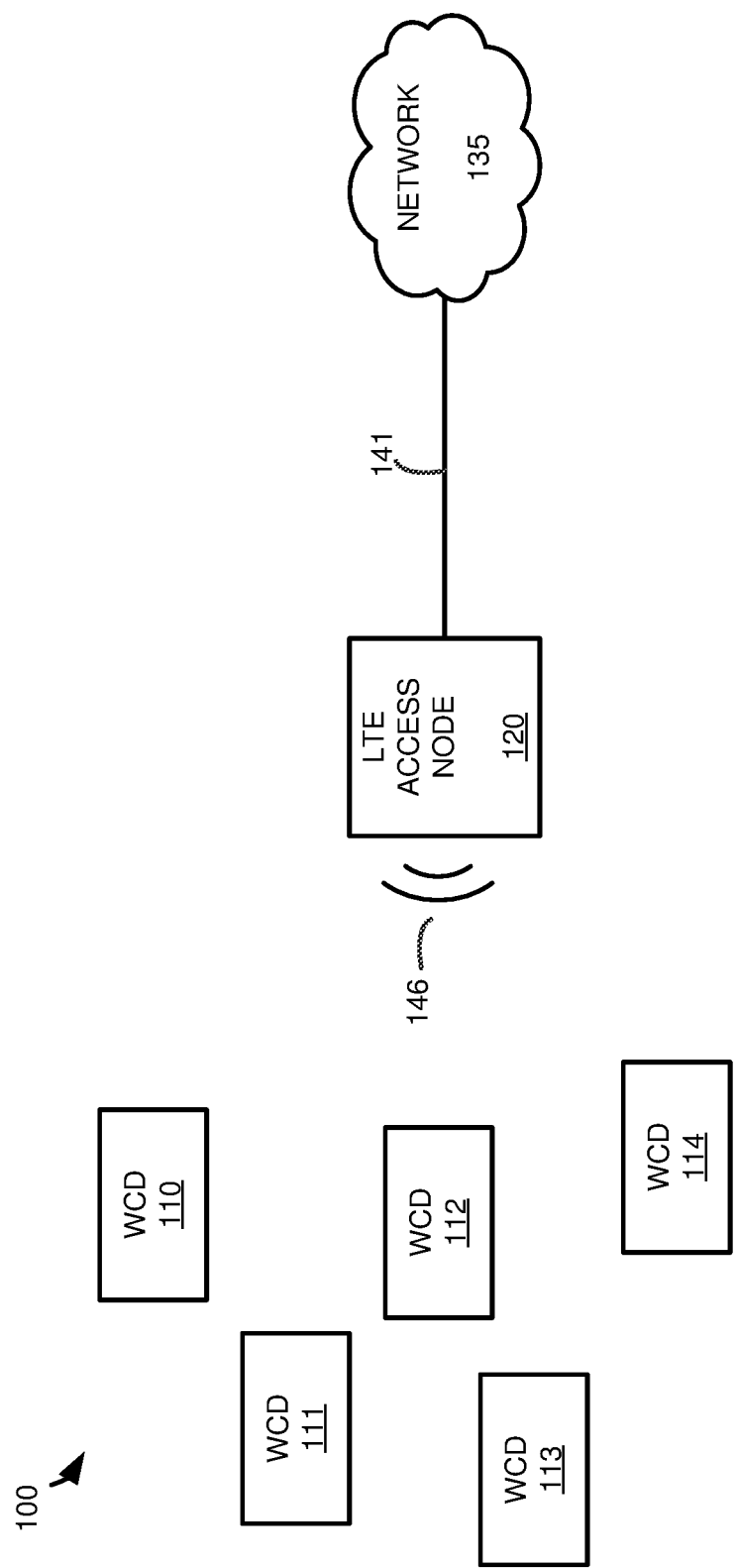
FIG. 1 illustrates a communication system to dynamically modify power headroom prohibit timers based on signaling load.

FIG. 1 illustrates a communication system 100 to dynamically modify power headroom prohibit timers based on signaling load. Communication system 100 includes wireless communication devices (WCDs) 110-114, Long Term Evolution (LTE) access node 120, and network 135. LTE access node 120 is representative of an eNodeB or some other LTE access point for a LTE service provider. Network 135 may include various gateways, routers, and other elements for the wireless service provider, and may further include routers and gateways of the Internet or some other packet data network. LTE access node 120 provides LTE signaling 146 to WCDs 110-114, and further communicates with network 135 via communication link 141.

In operation, WCDs 110-114 include various email, web browsing, gaming, file sharing, and other applications that require a wireless network to provide the desired operations. Here, WCDs 110-114 include device to device (D2D) communication capability that enables the devices to directly communicate when devices are in close proximity. This D2D communication, which is supervised by LTE access node 120 and other wireless provider systems, may permit the devices to improve spectrum utilization, overall throughput, and energy efficiency, while enabling new peer-to-peer and location-based applications for the devices.

To manage the D2D communications and the traditional non-D2D communications within the network, LTE access node 120 may direct the devices to transmit communication status information. This communication status information includes a power headroom (PHR) value indicative of how much relative power is left to transmit data in addition to the power being used in the current transmission. This PHR value is transmitted at intervals by each of WCDs 110-114, wherein the intervals are scheduled by LTE access node 120 and are determined based on the signaling load of the network. The signaling load of the network may be based on the number of D2D devices that are currently communicating with LTE access node 120, the number of D2D groups communicating via LTE access node 120, wherein the groups comprise two or more devices in direct communication with one another, or may comprise any other signaling load value for D2D communicating devices.

Figure 2:
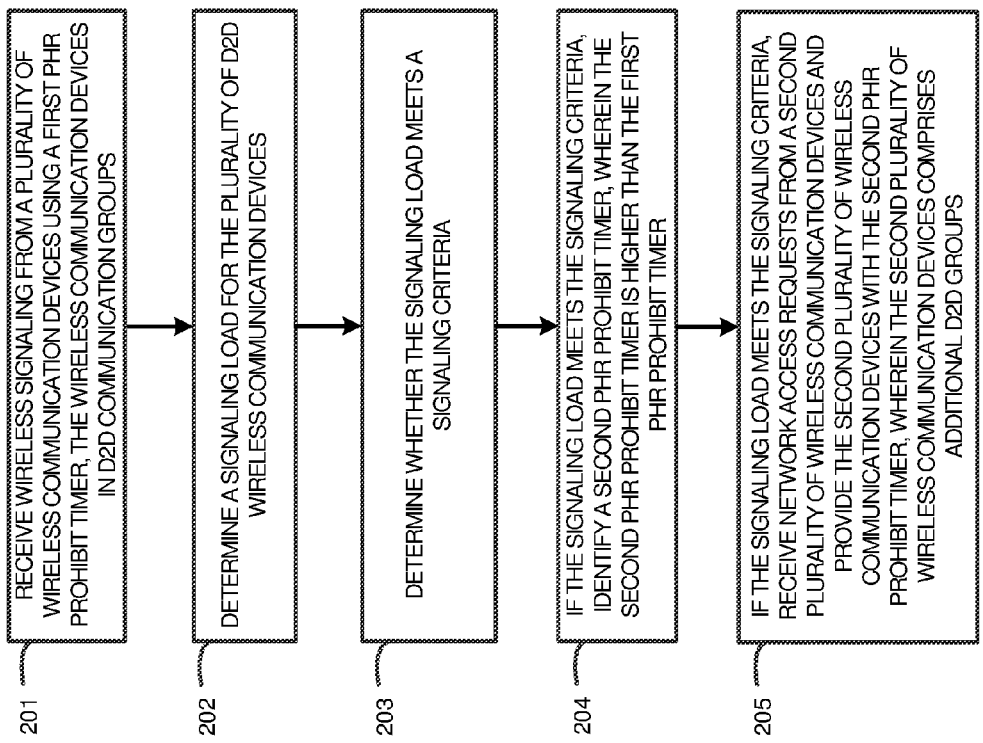
FIG. 2 illustrates a method of operating a Long Term Evolution access node to dynamically modify power headroom prohibit timers based on signaling load for a plurality of wireless communication devices.

To further illustrate the operations of LTE access node 120, FIG. 2 is provided. FIG. 2 illustrates a method of operating a LTE access node to dynamically modify power headroom prohibit timers based on signaling load for a plurality of wireless communication devices. The operations of FIG. 2 are referenced parenthetically in the paragraphs that follow with reference to systems and elements from communication system 100 of FIG. 1.

As described in FIG. 1, WCDs 110-114 provide communication information in wireless signals to LTE access node 120, wherein the communication information includes PHR values for each of the devices. These PHR values are transmitted to LTE access node 120 at intervals specified by a PHR prohibit timer that indicates the minimum number of packets that must be transmitted between PHR values. For example, a PHR prohibit timer may require the transmission of twenty packets between PHR values. LTE access node 120 receives the wireless signals from the plurality of WCDs using a first PHR prohibit timer, wherein the plurality of wireless communication devices comprises one or more D2D communication groups (201). For example, WCDs 110-112 may comprise a first D2D communication group, while WCDs 113-114 may comprise a second D2D communication group.

During the receipt of the wireless signals from WCD 110-114, LTE access node 120 determines a signaling load for WCDs 110-114 (202). This signaling load may be based on the quantity of D2D communication groups communicating with LTE access node 120, the number of D2D devices in the communication groups communicating with LTE access node 120, the uplink resource block allotment to the devices, or any other similar signal load information for the D2D communicating devices, including combinations thereof. Based on the signaling load, LTE access node 120 determines whether the signaling load meets a signaling criteria (203). For example, LTE access node 120 may quantify the number of D2D devices communicating via the access node, and compare this value to a signaling criteria value to determine whether the signaling load meets the required criteria.

If the signaling load does not meet the signaling criteria, then LTE access node 120 continues to provide LTE signaling to the devices using the first PHR prohibit timer. In contrast, if the signaling load does meet the signaling criteria, then LTE access node 120 identifies a second PHR prohibit timer, wherein the second PHR prohibit timer is higher than the first PHR prohibit timer (204). For example, a first PHR prohibit timer may prevent devices from communicating the PHR for twenty packets, while the second PHR prohibit timer may prevent devices from communicating the PHR for forty packets.

Further, if the signaling load meets the signaling criteria, LTE access node 120 receives network access requests from a second plurality of wireless devices, and provides the second plurality of wireless devices with the second PHR prohibit timer, wherein the second plurality of wireless devices comprises additional D2D communication groups (205). By providing newly connecting devices with a higher value for the PHR prohibit timer, LTE access node 120 may limit the signaling load incurred by the PHR values that are transmitted by the new devices. In some implementations, LTE access node 120 may further modify the PHR prohibit timer for the currently connecting devices by providing a notification, as a Radio Resource Control (RRC) Re-Configuration Message, to the currently connected devices, indicating a transition from the first PHR prohibit timer to the second PHR prohibit timer. Thus, newly connecting devices, and the devices already communicating with LTE access node 120 may use the higher value PHR prohibit timer.

As illustrative example with communication system 100, WCDs 110-114 may communicate PHR value using a first PHR prohibit timer of twenty packets. Once the signaling load meets the signaling criteria, LTE access node 120 may provide newly connecting devices, outside of WCDs 110-114, with a second PHR prohibit timer of forty packets, and may further modify the existing configuration with WCDs 110-114 to use the second PHR prohibit timer.

Although illustrated in the example of FIG. 2 as increasing the number of packets between PHR values, it should be understood that similar operations may be used to decrease the number of packets between PHR values. For example, if the signaling load indicated that additional PHR values could be transferred from the devices without causing a burden on the network, then LTE access node 120 may decrease the PHR prohibit value allocated to connecting devices. This would more efficiently use the resources of the network when resources are available.

Figure 3:
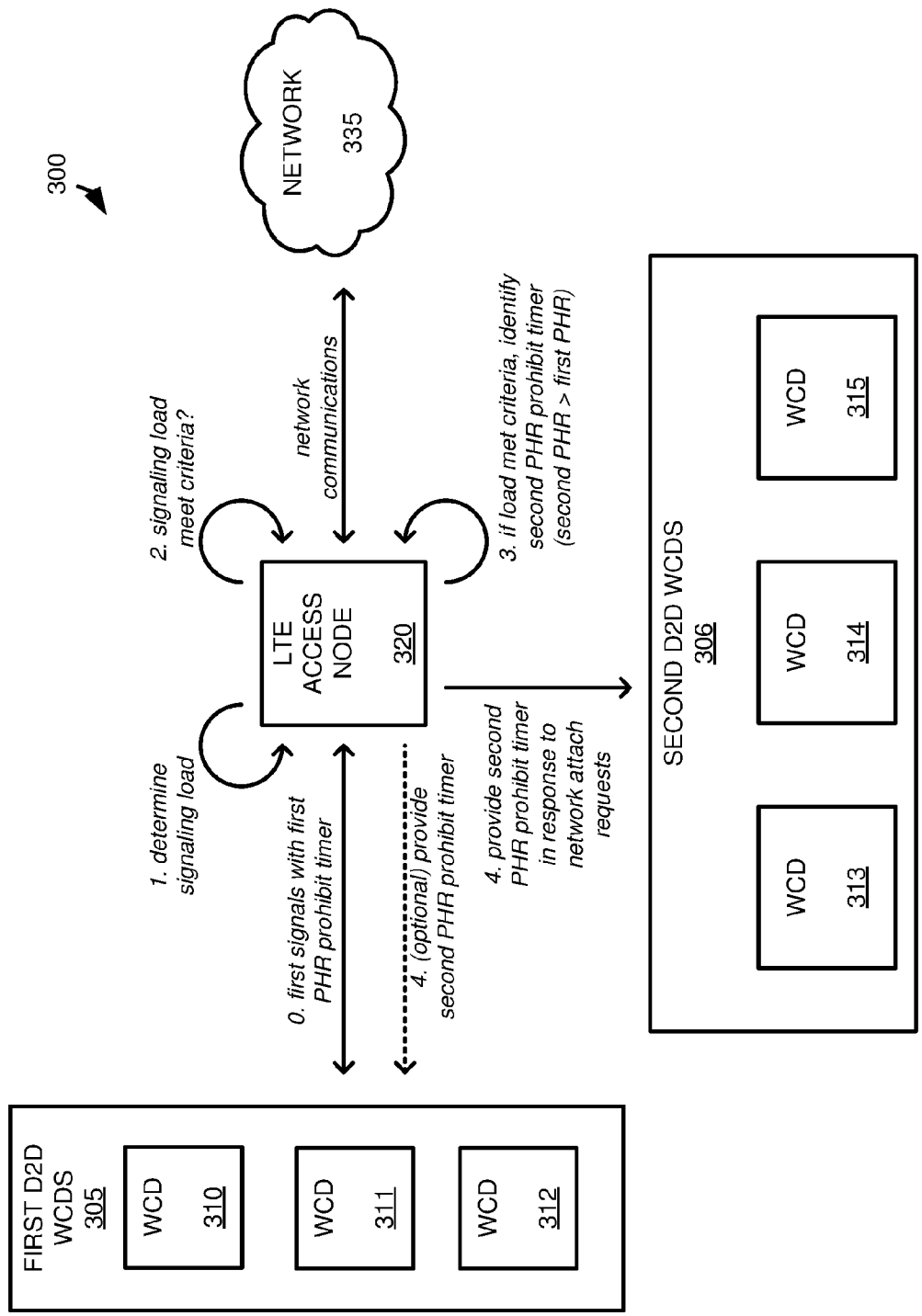
FIG. 3 illustrates an operational scenario of dynamically modifying power headroom prohibit timers based on signaling load for a plurality of wireless communication devices.

FIG. 3 illustrates an operational scenario 300 of dynamically modifying power headroom prohibit timers based on signaling load for a plurality of wireless communication devices. Operational scenario 300 includes first D2D WCDs 305, second D2D WCDs 306, LTE access node 320, and network 335. First D2D WCDs 305 include WCDs 310-312, and are representative of wireless devices currently communicating over LTE access node 320. Second D2D WCDs 306 include WCDs 313-315, and are representative of wireless devices that initiate communications after a signaling load criteria is identified in the communication signals for the first devices.

As depicted, at step 0, first D2D WCDs 305 communicate first signals with LTE access node 320, wherein the signals are defined by a first PHR prohibit timer. During the communication of the first signals, LTE access node 320, at step 1, determines a signaling load for first D2D WCDs 305, wherein the signaling load may be based on the number of D2D communication groups in first D2D WCDs 305, the number of wireless devices in first D2D WCDs 305, the number of uplink resources that are allocated to the communications of WCDs 310-312, or any other similar signaling load measurement, including combinations thereof. Based on the signaling load determination, LTE access node 320 determines if the signaling load meets a signaling criteria, at step 3. For example, the signaling criteria may require that a particular number of devices and a particular D2D communication groups be communicating with LTE access node 320 before transitioning to a second PHR prohibit timer.

Once it is determined that the signaling criteria is met by first D2D WCDs 305, LTE access node 320, at step 3, identifies a second PHR prohibit timer, wherein the second PHR prohibit timer is higher than the first PHR prohibit timer. This higher PHR prohibit timer, which requires a larger number of packets between PHR reports from each of the devices than the first PHR prohibit timer, permits LTE access node 320 to limit the congestion that is caused from the devices reporting PHR values.

After identifying the second PHR prohibit timer, LTE access node 320, at step 4, provides or allocates the second PHR prohibit timer to second D2D WCDs 306 that connect to the access node following the signaling load meeting the criteria. In particular, in response to requests from WCDs 313-315 to join the network, LTE access node 320 may permit access to the network and indicate that PHR values are to be sent in accordance with the second PHR prohibit timer. In some implementations, in addition to providing newly connected devices the modified PHR prohibit timer, LTE access node may further notify the devices that were already communicating with the node to use the second PHR prohibit timer. Referring to operational scenario 300, LTE access node may transfer a RRC Re-Configuration message to WCDs 310-312 indicating the change to the second PHR prohibit timer. Once WCDs 313-315 and, optionally, WCDs 310-312 are configured with the appropriate timer, WCDs may report the PHR values in wireless signals in accordance with the timer.

Figure 4:
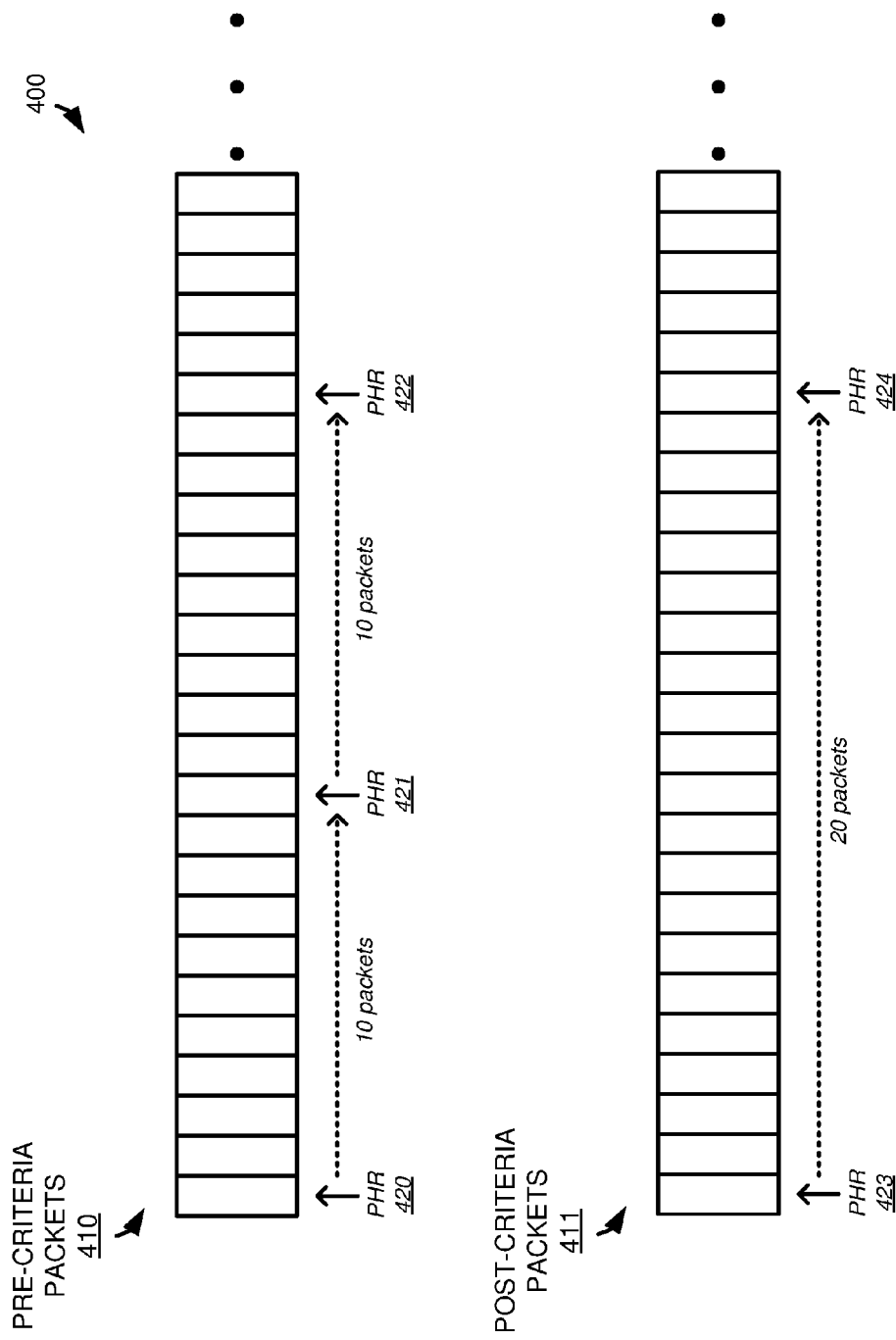
FIG. 4 illustrates an overview of communicating data packets from a wireless communication device to the Long Term Evolution access node.

FIG. 4 illustrates an overview 400 of communicating data packets from a wireless communication device to a LTE access node according to one implementation. Overview 400 includes pre-criteria packets 410, post-criteria packets 411, and PHRs 420-424. Pre-criteria packets 410 are representative of packets transferred by a WCD with a PHR prohibit timer of ten packets (can transmit a PHR on every tenth packet). Post-criteria packets 411 are representative of packets transferred by the WCD with a PHR prohibit timer of twenty packets (can transmit a PHR on every twentieth packet). Although illustrated in the present example as transmitting PHR information at the minimum number of packets as defined by the PHR prohibit timer, it should be understood that packets can be transmitted at any time after the PHR prohibit timer expires.

As described herein, a LTE access node may allocate a first PHR prohibit timer to wireless devices communicating with the LTE access node, which defines the minimum number of packets that must be transmitted between PHR updates to the LTE access node. Here, the first PHR prohibit timer, represented in pre-criteria packets 410, permits a WCD to transmit a PHR value every tenth packet. During the communications for the WCDs connected to the LTE access node, the LTE access node may identify that the signaling load for the WCDs has reached a predefined signaling criteria. In response to meeting the signaling criteria, the LTE access node may identify a second PHR prohibit timer, and provide the PHR prohibit timer to newly connecting D2D devices to the LTE access node, as well as devices that are currently communicating with the LTE access node.

In the present example, the second PHR prohibit value indicates to the WCDs to increase the number of minimum packets between the transmission of PHR values. This increase in the minimum number of packets may reduce the signaling load, as a lesser number of PHR values will be transmitted from each of the communicating wireless devices. In particular, the LTE access node requires, in post-criteria packets 411, that a wireless device increase the PHR prohibit timer from transmitting every tenth packet to transmitting every twentieth packet. Accordingly, as demonstrated in overview 400, PHR 424 is transmitted on the twentieth packet following PHR 423.

Although described in the example of over 400 as increasing the PHR prohibit value in response to meeting a signaling criteria, it should be understood that similar operations may be used to decrease the PHR prohibit value in response to meeting signaling criteria. For example, if the LTE access node determined that a larger number of uplink resources were available for the devices to transmit PHR values, the LTE access node may decrease the PHR prohibit value to more efficiently use the wireless resources available to the devices.

Figure 5:
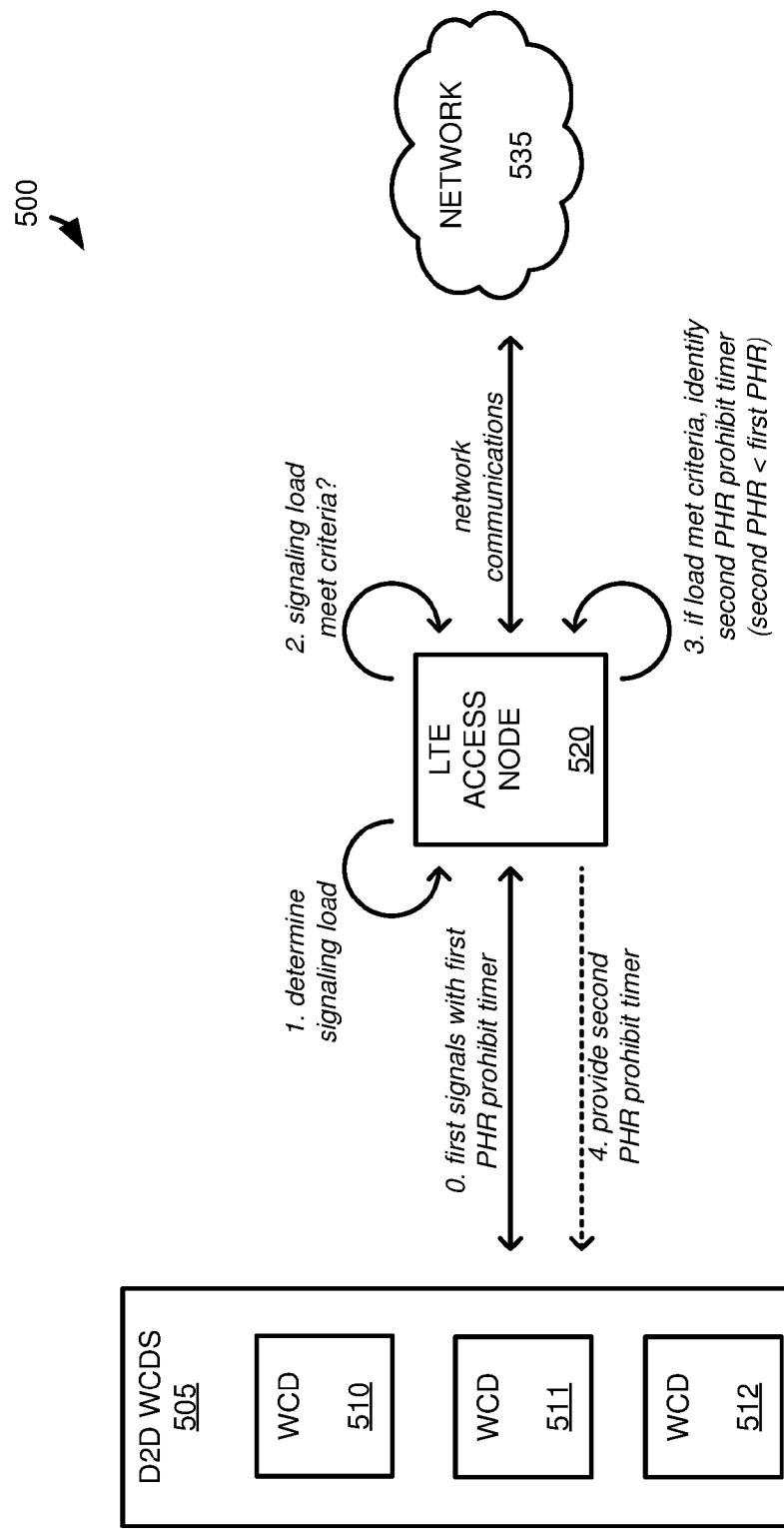
FIG. 5 illustrates an operational scenario of dynamically modifying power headroom prohibit timers based on signaling load for a plurality of wireless communication devices.

FIG. 5 illustrates an operational scenario 500 of dynamically modifying power headroom prohibit timers based on signaling load for a plurality of wireless communication devices. Operational scenario 500 includes D2D WCDs 505, LTE access node 520, and network 535. D2D WCDs 505 includes WCDs 510-512, although it should be understood that other numbers of WCDs may be attached to LTE access node 520.

In operation, D2D WCDs 505, at step 0, communicate first signals with LTE access node 520 using a first PHR prohibit timer. During the communication with LTE access node 520, LTE access node 520, at step 1, determines a signaling load for the D2D WCDs 505 and, at step 2, determines if the signaling load for the D2D WCDs 505 meets signaling criteria. This signaling load may be based on the number of devices in D2D WCDs 505, based on the number of D2D WCDs 505, based on the number of resource blocks allocated to communications for D2D WCDs 505, or any other similar factor for the D2D communicating devices, including combinations thereof.

If the load meets the defined signaling criteria, LTE access node 520, at step 3, identifies a second PHR prohibit timer that can be provided to devices communicating with LTE access node 520. Unlike the previous examples in FIGS. 1-4, rather than increasing the number of packets between PHR values being transmitted to LTE access node 520, LTE access node 520 decreases the minimum number of packets required between PHR values. Thus, the second PHR prohibit timer is less or lower than the first PHR prohibit timer provided to D2D WCDs 505. This permits WCDs 510-512 to more frequently provide PHR values in communication signals to LTE access node 520, allowing the devices to specify the headroom available for future data transmission. This second prohibit value may also be provided to newly connecting devices as they request access to the network.

In some implementations, to determine whether the signaling load for D2D wireless devices meet signaling criteria, LTE access node 520 may use one or more data structures such as tables, arrays, linked lists, or other similar data structures capable of associated PHR prohibit timers with signaling load values. For example, a table may include a plurality of PHR prohibit timers with signaling load requirements for each of the prohibit timers, such as a number of WCDs required for each PHR prohibit timer, a number of D2D communication groups required for each PHR prohibit timer, or any other signaling load value, including combinations thereof. Once it is determined that the signaling load requires a different PHR prohibit timer than is currently being allocated to connecting devices, LTE access node 520 may transition to using the PHR prohibit timer associated with the current signaling load.

Figure 6:
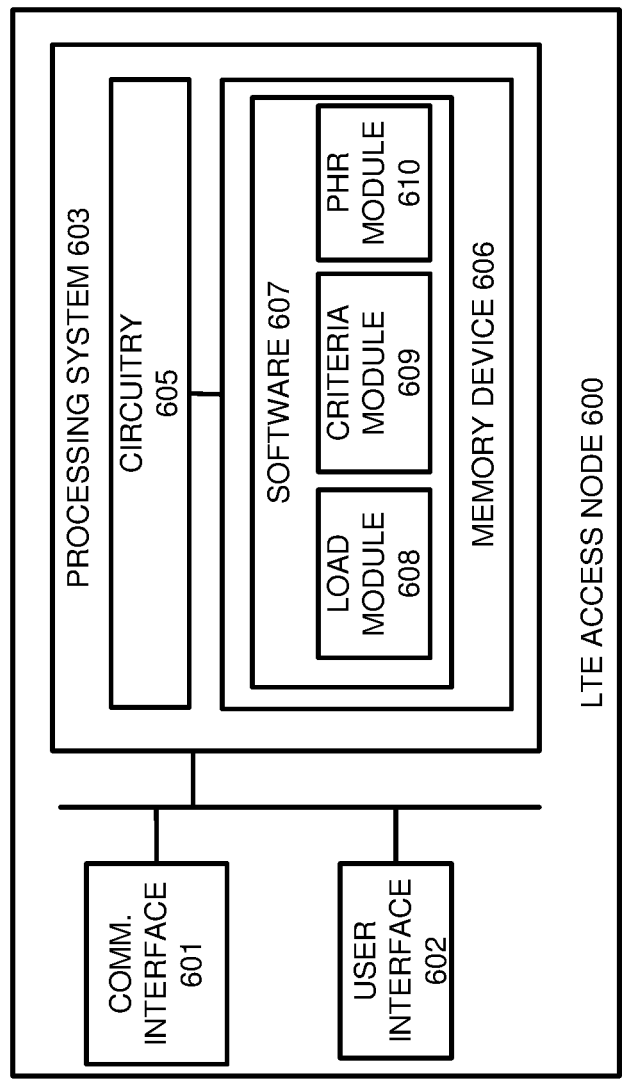
FIG. 6 illustrates a Long Term Evolution access node to dynamically modify power headroom prohibit timers based on signaling load for a plurality of wireless communication devices.

FIG. 6 illustrates a LTE access node 600 to dynamically modify PHR timers based on signaling load for a plurality of wireless communication devices. LTE access node 600 is representative of any computing system or systems with which the various operational architectures, processes, scenarios, and sequences disclosed herein for a LTE access node may be implemented. LTE access node 600 is an example of LTE access node 120, 320, and 520, although other examples may exist. LTE access node 600 comprises communication interface 601, user interface 602, and processing system 603. Processing system 603 is linked to communication interface 601 and user interface 602. Processing system 603 includes processing circuitry 605 and memory device 606 that stores operating software 607. LTE access node 600 may include other well-known components such as a battery and enclosure that are not shown for clarity.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In particular, communication interface 601 may be configured to communicate with one or more routers and gateways of a LTE service provider network, and further configured to wirelessly communicate with a plurality of WCDs.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes load module 608, criteria module 609, and PHR module 610, although any number of software modules may provide the same operation. Operating software 607 may further include an operating system, utilities, drivers, network interfaces, applications, or some other type of software. When executed by processing circuitry 605, operating software 607 directs processing system 603 to operate LTE access node 600 as described herein.

In at least one implementation, load module 608 directs processing system 603 to receive wireless signals from a plurality of wireless devices in one or more D2D communication groups, wherein the plurality of wireless devices is allocated a first PHR prohibit timer. While receiving the signals, load module 608 further directs processing system 603 to determine a signaling load for the wireless devices, wherein the signaling load may be based on the number of connecting D2D devices, the number of D2D communication groups, the number of resource blocks allocated to the communicating devices, or any other similar signaling load information for D2D wireless devices, including combinations thereof. Based on the signaling load, criteria module 609 directs processing system 603 to determine whether the signaling load meets signaling criteria. If the signaling load meets signaling criteria, PHR module 610 determines a second PHR prohibit timer to be allocated to connecting wireless communication devices.

In some implementations, the second PHR prohibit timer may be higher than the first PHR prohibit timer to limit the signaling load on the system. For example, if the first PHR prohibit timer permitted PHR values to be transmitted every ten packets, the second PHR prohibit timer may be permit PHR values to be transmitted every twenty packets. Thus, limiting the amount of resources that are required to transmit PHR values for the wireless devices.

In other implementations, the second PHR prohibit timer may be lower than the first PHR prohibit timer, permitting the devices to indicate additional PHR values and more accurately reflect the PHR of the device. For example, if the first PHR prohibit timer permitted PHR values to be transmitted every twenty packets, the second PHR prohibit timer may permit PHR values to be transmitted every ten packets. Thus, allowing the devices to more efficiently use available uplink resources to notify the LTE access node of the PHR.

Once the new PHR prohibit timer is identified using PHR module 610, PHR module 610 directs the processing system 603 to provide the new PHR prohibit timer to devices connecting to LTE access node 600. In some examples, PHR module may provide the new PHR prohibit timer to newly connecting devices. For example, when new WCDs associated with new D2D groups initiate an attach request, LTE access node 600 may provide the new devices with the second PHR prohibit timer. In some implementations, in addition to or in place of providing new devices with the second PHR prohibit timer, LTE access node 600 may communicate a notification to currently attached D2D WCDs indicating the transition to the second PHR prohibit timer. This notification permits the devices already communicating with LTE access node to reduce or increase the number of PHR values that are transmitted based on the signaling load associated with the wireless sectors provided by LTE access node 600.

In some implementations, LTE access node 600 may access one or more data structures capable of associating PHR prohibit timers with current signaling load information for the D2D WCDs. These data structures may comprise tables, linked lists, arrays, or any other similar data structure capable of associating PHR prohibit timers with current signaling load information for the connected D2D wireless devices. For example, based on a first signaling load, LTE access node may provide a first PHR prohibit timer. Once the signaling load meets criteria for a second PHR prohibit timer based on values within the data structure, LTE access node 600 may provide the second PHR prohibit timer to newly connecting and/or currently connected D2D WCDs.

Returning to the elements of FIG. 1, WCDs 110-114 may each comprise Radio Frequency (RF) communication circuitry and an antenna. The RF communication circuitry typically includes an amplifier, filter, modulator, and signal processing circuitry. WCDs 110-114 may each include include a user interface, memory device, software, processing circuitry, or some other communication components. WCDs 110-114 may each comprise a telephone, computer, e-book, mobile Internet appliance, wireless network interface card, media player, game console, or some other wireless communication apparatus.

LTE access node 120 may comprise radio frequency (RF) communication circuitry and at least one antenna to provide wireless communication services to WCDs 110-114. The RF communication circuitry typically includes an amplifier, filter, RF modulator, and signal processing circuitry. LTE access node 120 may comprise a router, server, memory device, software, processing circuitry, cabling, power supply, network communication interface, structural support, or some other communication apparatus. LTE access node 120 may comprise an eNodeB in at least one example.

Network 135 may comprise the wireless service provider network, the Internet, IMS, or some other network that provides data services to WCDs 110-114. Communication network 135 may comprise switches, wireless access nodes, Internet routers, network gateways, application servers, computer systems, communication links, or some other type of communication equipment—including combinations thereof.

Wireless signaling 146 uses wireless links that use the air or space as transport media for LTE communication format. Communication link 141 uses metal, glass, air, space, or some other material as the transport media. Communication link 141 could use various communication protocols, such as Time Division Multiplex (TDM), Internet Protocol (IP), Ethernet, communication signaling, wireless communication signaling, or some other communication format—including combinations thereof. Communication link 141 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a Long Term Evolution (LTE) access node to dynamically modify power headroom (PHR) prohibit timers, the method comprising:
   receiving wireless signals from a plurality of wireless communication devices using a first PHR prohibit timer, wherein the plurality of wireless communication devices comprises one or more device to device (D2D) communication groups;
   determining a signaling load for the plurality of wireless communication devices;
   determining whether the signaling load meets signaling criteria;
   if the signaling load meets the signaling criteria, identifying a second PHR prohibit timer, wherein the second PHR prohibit timer is higher than the first PHR prohibit timer; and
   if the signaling load meets the signaling criteria, receiving network access requests from a second plurality of wireless communication devices and providing the second plurality of wireless communication devices with the second PHR prohibit timer, wherein the second plurality of wireless communication devices comprises one or more additional D2D communication groups.

2. The method of claim 1 further comprising, if the signaling load meets the signaling criteria, transfer a notification to the plurality of wireless communication devices that indicates a transition to the second PHR prohibit timer.

3. The method of claim 2 wherein the notification comprises a Radio Resource Control (RRC) Re-Configuration Message.

4. The method of claim 1 wherein determining the signaling load for the plurality of wireless communication devices comprises determining a quantity of devices in the plurality of wireless communication devices.

5. The method of claim 4 wherein determining the signaling load for the plurality of wireless communication devices further comprises determining a quantity of groups in the one or more D2D communication groups.

6. The method of claim 1 wherein determining the signaling load for the plurality of wireless communication devices comprises determining an uplink resource block allotment to the plurality of wireless communication device.

7. The method of claim 1 wherein determining the signaling load for the plurality of wireless communication devices comprises determining a quantity of groups in the one or more D2D communication groups.

8. The method of claim 1 wherein the Long Term Evolution (LTE) access node comprises an eNodeB.

9. The method of claim 1 further comprising receiving second wireless signals from the second plurality of wireless communication devices using the second PHR prohibit timer.

10. An apparatus to dynamically modify power headroom (PHR) prohibit timers, the apparatus comprising:
    at least one non-transitory computer readable media; and
    processing instructions stored on the at least one non-transitory computer readable media that, when executed by a processing system, direct the processing system to:
    receive wireless signals from a plurality of wireless communication devices using a first PHR prohibit timer, wherein the plurality of wireless communication devices comprises one or more device to device (D2D) communication groups;
    determine a signaling load for the plurality of wireless communication devices;
    determine whether the signaling load meets signaling criteria;
    if the signaling load meets the signaling criteria, identify a second PHR prohibit timer, wherein the second PHR prohibit timer is higher than the first PHR prohibit timer; and
    if the signaling load meets the signaling criteria, receive network access requests from a second plurality of wireless communication devices and provide the second plurality of wireless communication devices with the second PHR prohibit timer, wherein the second plurality of wireless communication devices comprises one or more additional D2D communication groups.

11. The apparatus of claim 10 wherein the processing instructions further direct the processing system to, if the signaling load meets the signaling criteria, transfer a notification to the plurality of wireless communication devices that indicates a transition to the second PHR prohibit timer.

12. The apparatus of claim 11 wherein the notification comprises a Radio Resource Control (RRC) Re-Configuration Message.

13. The apparatus of claim 10 wherein the processing instructions to determine the signaling load for the plurality of wireless communication devices direct the processing system to determine a quantity of devices in the plurality of wireless communication devices.

14. The apparatus of claim 13 wherein the processing instructions to determine the signaling load for the plurality of wireless communication devices further direct the processing system to determine a quantity of groups in the one or more D2D communication groups.

15. The apparatus of claim 10 wherein the processing instructions to determine the signaling load for the plurality of wireless communication devices direct the processing system to determine an uplink resource block allotment to the plurality of wireless communication devices.

16. The apparatus of claim 10 wherein the processing instructions to determine the signaling load for the plurality of wireless communication devices direct the processing system to determine a quantity of groups in the one or more D2D communication groups.

17. The apparatus of claim 10 wherein the processing instructions further direct the processing system to receive second wireless signals from the second plurality of wireless communication devices using the second PHR prohibit timer.

18. A method of operating a Long Term Evolution (LTE) access node to dynamically modify power headroom (PHR) prohibit timers, the method comprising:
    receiving wireless signals from a plurality of wireless communication devices using a first PHR prohibit timer, wherein the plurality of wireless communication devices comprises one or more device to device (D2D) communication groups;
    determining a signaling load for the plurality of wireless communication devices;
    determining whether the signaling load meets signaling criteria;
    if the signaling load meets the signaling criteria, identifying a second PHR prohibit timer, wherein the second PHR prohibit timer comprises one of a higher PHR prohibit timer than the first PHR prohibit timer or a lower PHR prohibit timer than the first PHR prohibit timer;
    if the signaling load meets the signaling criteria, receiving network access requests from a second plurality of wireless communication devices and providing the second plurality of wireless communication devices with the second PHR prohibit timer, wherein the second plurality of wireless communication devices comprises one or more additional D2D communication groups; and
    if the signaling load meets the signaling criteria, transfer a notification to the plurality of wireless communication devices that indicates a transition to the second PHR prohibit timer.

19. The method of claim 18 wherein determining the signaling load for the plurality of wireless communication devices comprises at least one of determining a quantity of devices in the plurality of wireless communication devices or determining a quantity of groups in the one or more D2D communication groups.

20. The method of claim 18 wherein the notification comprises a Radio Resource Control (RRC) Re-Configuration Message.

\* \* \* \* \*